United States Patent
Ishikawa et al.

(10) Patent No.: US 7,905,506 B2
(45) Date of Patent: Mar. 15, 2011

(54) STEP HOLDER MOUNTING STRUCTURE OF MOTORCYCLE

(75) Inventors: Yuzuru Ishikawa, Wako (JP); Keisuke Nakata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 211 days.

(21) Appl. No.: 12/165,786

(22) Filed: Jul. 1, 2008

(65) Prior Publication Data
US 2009/0008900 A1    Jan. 8, 2009

(30) Foreign Application Priority Data

Jul. 5, 2007   (JP) ................................ 2007-177455

(51) Int. Cl.
*B62D 61/02* (2006.01)
*B62J 25/00* (2006.01)

(52) U.S. Cl. ........................................ 280/291; 180/219

(58) Field of Classification Search .................. 180/219; 280/291, 163; 297/37.1; 74/564
See application file for complete search history.

(56) References Cited

U.S. PATENT DOCUMENTS

| | | | | |
|---|---|---|---|---|
| 5,458,213 | A | * | 10/1995 | Nakaya et al. ................ 180/219 |
| 6,318,743 | B1 | * | 11/2001 | Nakashima et al. ....... 280/152.1 |
| D601,472 | S | * | 10/2009 | Griffin et al. ................ D12/179 |
| 2005/0269800 | A1 | * | 12/2005 | Suzuki et al. ................ 280/291 |
| 2006/0283647 | A1 | * | 12/2006 | Seki et al. .................... 180/219 |
| 2007/0102216 | A1 | * | 5/2007 | Satake et al. ................. 180/219 |
| 2007/0205631 | A1 | * | 9/2007 | Nobuhira et al. .......... 296/181.1 |
| 2008/0202835 | A1 | * | 8/2008 | Suita et al. ................... 180/219 |

FOREIGN PATENT DOCUMENTS

| | | |
|---|---|---|
| JP | 4-31914 Y2 | 7/1992 |
| JP | 6-329066 A | 11/1994 |
| JP | 2687126 B2 | 8/1997 |
| JP | 2002-264868 A | 9/2002 |

* cited by examiner

*Primary Examiner* — Anne Marie M Boehler
(74) *Attorney, Agent, or Firm* — Westerman, Hattori, Daniels & Adrian, LLP

(57) ABSTRACT

In the step holder mounting structure of a motorcycle which mounts step holders for supporting steps of a rider on a seat rail extending rearwardly from a main frame, the step holders are fastened to the seat rail from the inside of a vehicle.

4 Claims, 8 Drawing Sheets

STEP HOLDER MOUNTING STRUCTURE OF MOTORCYCLE

TECHNICAL FIELD

The present invention relates to a step holder mounting structure of a motorcycle for mounting a step holder on a seat rail.

BACKGROUND OF THE INVENTION

A motorcycle includes a step (foot rest) on which a rider who sits on a rear seat can place his/her foot. The step is mounted on a step holder mounted on a vehicle body side. With respect to the structure which mounts the step holder on the vehicle body side, various kinds of structures have been known (for example, see JP-A-2002-264868, JP-UM-B-04-31914, Japanese Patent No. 2687126, and JP-A-06-329066).

A step holder disclosed in JP-A-2002-264868 is mounted on an outer upper portion of a lower frame in an overlapping manner and is configured to appear substantially continuously with a side cover as viewed in a side view, thus enhancing the appearance.

On the other hand, a step holder disclosed in JP-UM-B-04-31914 is joined to a seat rail and a rear stay from the outside, thus making an apparatus for reinforcing the connection between the seat rail and the rear stay unnecessary.

Further, a step holder disclosed in Japanese Patent No. 2687126 adopts a frame structure which allows the mounting of the step holder from the outside of a seat rail, thus reducing the number of parts and the weight of a motorcycle.

Still further, a step holder disclosed in JP-A-06-329066 includes a crest-shape bracket which also functions as a rear fender, and the bracket is fastened to a vehicle body frame from the outside using fastening bolts.

All of these step holders are configured to be mounted on a vehicle body by inserting the mounting bolts toward an inner side from the outside of the vehicle body. Accordingly, head portions of the mounting bolts are observed from the outside of the vehicle body. Conventionally, for concealing a seat rail, a rear cowl (a rear cover), a side cover or the like is arranged outside the seat rail and hence, there has been known a technique which conceals the mounting bolts by the rear cowl or the like.

SUMMARY OF THE INVENTION

However, by enhancing a design of an outer portion of the seat rail, it no longer becomes necessary to cover the seat rail with the rear cowl or the like. In this case, however, the mounting bolts of the step holder cannot be concealed from the outside of the vehicle body and hence, it is difficult to enhance the appearance of the vehicle body. Further, the increase of a size of the rear cowl sufficient to conceal the mounting bolts or the provision of an additional side cover is not desirable. This is because the degrees of freedom of the design of motorcycle are reduced.

The present invention has been made under the above-mentioned circumstances, and it is an object of the present invention to provide a step holder mounting structure of a motorcycle which can enhance the appearance of the motorcycle as observed from the outside without concealing mounting bolts with a rear cowl or the like.

A step holder mounting structure of a motorcycle according to the present invention is characterized in that, in a step holder mounting structure of a motorcycle which mounts a step holder for supporting stepping of a rider on a seat rail extending rearwardly from a main frame, the step holder is fastened to the seat rail from the inside of a vehicle.

Due to such a constitution, it is possible to prevent the fastening member (mounting bolt) for mounting the step holder from being observed from an outer surface of the seat rail.

Further, a cover may be disposed in the axial direction of the fastening member of the step holder and more to the inside of the vehicle than the fastening member.

Due to such constitution, it is possible to prevent the fastening member for mounting the step holder from being removed from the seat rail.

Further, a groove may be formed on a whole inner surface of the seat rail, and at least one rib for reinforcing a mounting portion of the step holder may be mounted inside of the groove.

Due to such a constitution, it is possible to ensure the strength of the mounting portion of the step holder while making the seat rail light-weight.

According to the present invention, by fastening the step holder to the seat rail from the inside of the vehicle, it is possible to prevent the mounting portion of the step holder and the fastening member for mounting the step holder from being observed from an outer surface of the seat rail (outer surface of the vehicle body). Accordingly, different from the conventional technique, it is unnecessary to conceal a fastening portion of the fastening member using a side cover or a rear cowl which covers the seat rail. Hence, it is possible to enhance the degree of freedom in designing of a portion where the seat rail is provided. Further, by enhancing the design of an outer surface of the seat rail, it is possible to decrease an area of the seat rail covered with the side cover or it is possible to make the side cover unnecessary. Hence, the cost of parts of the vehicle body can be reduced as a whole.

Further, by arranging a cover more to the inside of the vehicle than the fastening member in the axial direction of the fastening member of the step holder, the fastening member is brought into contact with the cover before being removed from the step holder. Hence, the cover performs a function of preventing the removal of the fastening member. Accordingly, the step holder can be surely mounted on the seat rail.

Further, by forming a groove on the whole inner surface of the seat rail and by mounting a rib for reinforcing the mounting portion of the step holder in the inside of the groove, the seat rail can be light-weight. Accordingly, the whole vehicle body can be light-weight and, at the same time, a material cost of the seat rail can be reduced. Further, the strength of the mounting portion of the step holder can be ensured and hence, it is possible to surely mount the step holder on the seat rail.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
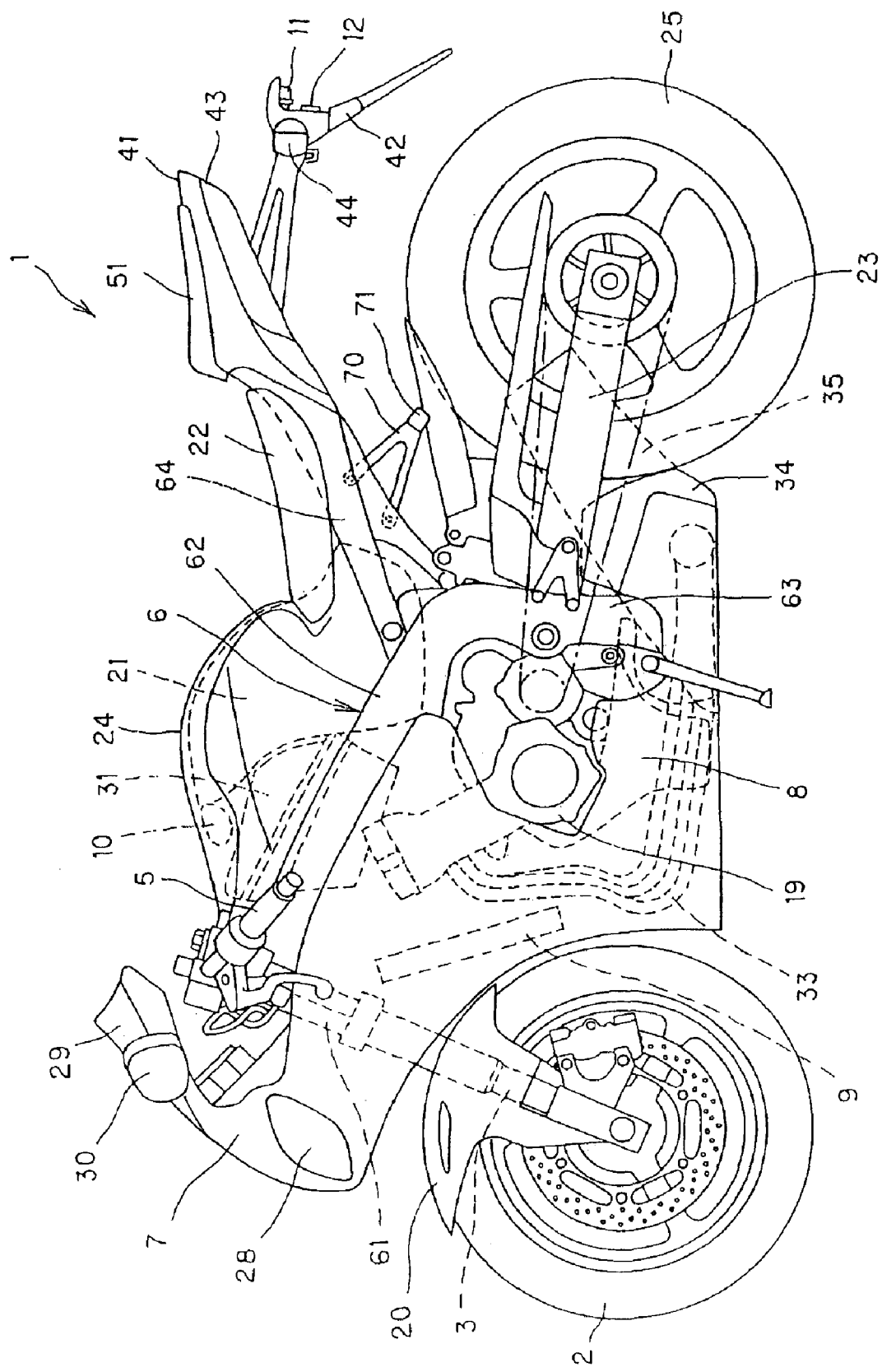
FIG. 1 is a left side view of a motorcycle according to an embodiment of the present invention.

Hereinafter, the step holder mounting structure of a motorcycle according to an embodiment of the present invention is explained in conjunction with drawings. FIG. 1 is a left side view of the motorcycle 1 according to the embodiment of the present invention. Here, in the explanation made hereinafter, the upward and downward directions and the frontward and rearward directions indicate the directions with respect to the motorcycle 1 shown in FIG. 1, and the leftward and rightward directions are the directions as observed from a rider.

As shown in FIG. 1, the motorcycle 1 includes a vehicle body frame 6. The vehicle body frame 6 is constituted of a head pipe 61, a pair of left and right main frames 62 which is bent downwardly after extending obliquely in the rearward and downward direction from the head pipe 61, a pair of left and right pivot plates 63 which is contiguously connected to rear portions of the main frames 62, and a cross member, not shown in the drawing, which connects the pivot plates 63 to each other in a horizontal manner. Further, a seat rail 64 extending obliquely in the rearward and upward direction is mounted on bent portions of the main frames 62 where the main frames 62 are bent in the downward direction. In the frame structure of a vehicle of this type, an engine 19, a crankcase and the like are mounted in a state that these parts are suspended from the vehicle body frame 6. That is, the so-called suspension-type structure is adopted as the frame structure thus making the whole vehicle body light-weight.

As shown in FIG. 1, a front fork 3 is rockably joined to the head pipe 61 of the vehicle body frame 6. A front wheel 2 including a hydraulic disc brake is rotatably supported on a lower end portion of the front fork 3, and a front fender 20 is arranged above the front wheel 2. The front fender 20 is mounted on the front fork 3 in a state that the front fender 20 is supported on the front fork 3. Further, a steering handle 5 is mounted on an upper end portion of the front fork 3.

As shown in FIG. 1, a water-cooled in-line 4-cylinder transverse engine 19, for example, is mounted on a lower side of a center portion of the vehicle body frame 6. A middle cowl 8 is mounted on both left and right sides of the engine 19. The middle cowls 8 are detachably mounted on a vehicle body contiguously with an upper cowl 7. Further, two-lamp head lights 28, 28, a wind screen 29, a pair of left and right mirrors 30, 30 are mounted on the upper cowl 7. A front turn signal is respectively incorporated in the mirrors 30, 30.

A fuel tank 21 is mounted on an upper portion of the vehicle body frame 6 above the engine 19. An air cleaner box 31 is arranged in front of the fuel tank 21. Further, an electronic control unit (ECU) 10 for controlling a throttle body and the like is arranged in front of the fuel tank 21 and above an upper portion of the air cleaner box 31. The electronic control unit 10, the fuel tank 21, and the air cleaner box 31 have whole upper portions and both sides thereof covered with a fuel tank cover 24. The air cleaner box 31 is configured to introduce traveling wind from an intake port, not shown in the drawing, formed in a front portion of the vehicle body and to feed purified air to the throttle body, not shown in the drawing. Further, fuel in the fuel tank 21 is sucked by a fuel supply pump, not shown in the drawing which is arranged in the inside of the fuel tank 21 and, then, the fuel is fed to the throttle body. Accordingly, an air-fuel mixture which is produced by mixing air and fuel in the throttle body is supplied to the engine 19.

A radiator 9 which is connected to the engine 19 by way of a pipe, not shown in the drawing, and is provided for supplying cooling water is arranged in front of the engine 19. Further, four exhaust pipes 33 are connected to the engine 19 and extend from a front side of the engine 19. These exhaust pipes 33 extend downwardly from the engine 19 and, thereafter, extend toward a rear portion of the vehicle along a bottom portion of the vehicle body, and are connected to a chamber 34 arranged on a right side of the vehicle body. A muffler 35 connected to the chamber 34 projects in the oblique rearward and upward direction. The muffler 35 has a rear end portion thereof arranged at a front oblique upper position with respect to a rear wheel shaft. Although the muffler has a relatively small length, for sufficiently ensuring an exhaust passage and a space in the inside of the muffler 35, the muffler 35 has a large diameter.

Here, the above-mentioned middle cowls 8 on the right side and the left side have different shapes. To be more specific, the left middle cowl covers a side surface of a portion of the exhaust pipe 33 where the exhaust pipe 33 is connected to the chamber 34. On the other hand, the right middle cowl is formed to cover a side surface of a portion of the vehicle body up to the muffler 35 for avoiding the coverage of the muffler 35.

Further, a swing arm 23 (rear fork) is rockably supported on a rear lower portion of the vehicle body frame 6, and a chain-driven-type rear wheel 25 including a hydraulic disc brake is rotatably supported on a rear end portion of the swing arm 23 below the rear fender 42.

On the other hand, a front seat 22 and a rear seat (pillion seat) 51 are respectively mounted on an upper portion of the seat rail 64. A rear cowl 41 and the rear fender 42 are arranged in the vicinity of the rear seat 51. A pair of left and right rear turn signals 44 is mounted on the rear fender 42. Further, a pair of left and right step holders 70, 70 is mounted on the seat rail 64, and steps 71, 71 are respectively mounted on lower portions of the step holders 70, 70.

Although the rear cowl 41 covers a rear portion of the seat rail 64, the rear cowl 41 does not cover a center portion and a front portion of the seat rail 64. That is, the rear cowl 41 has a small area for covering side surfaces of the vehicle body, and the whole profile of the rear cowl 41 is miniaturized compared to a conventional rear cowl. A stop lamp 43 is mounted on the rear cowl 41.

In FIG. 1, numeral 11 indicates a license plate light for illuminating a license plate arranged on a rear portion of the vehicle body, and numeral 12 indicates a reflector.

Figure 2:
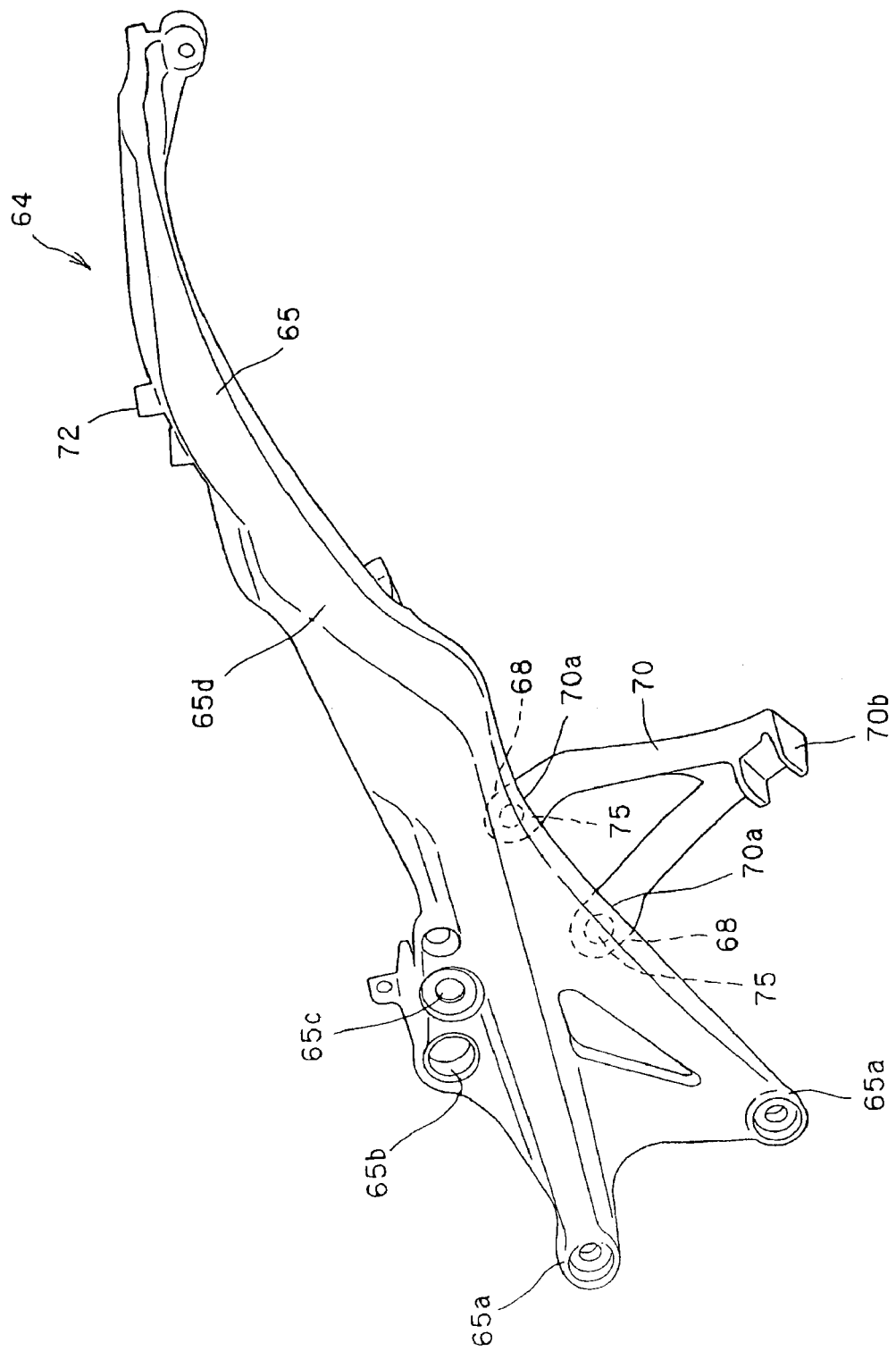
FIG. 2 is an outer side view showing a state that a step holder is mounted on a side wall portion of a seat rail.
Figure 3:
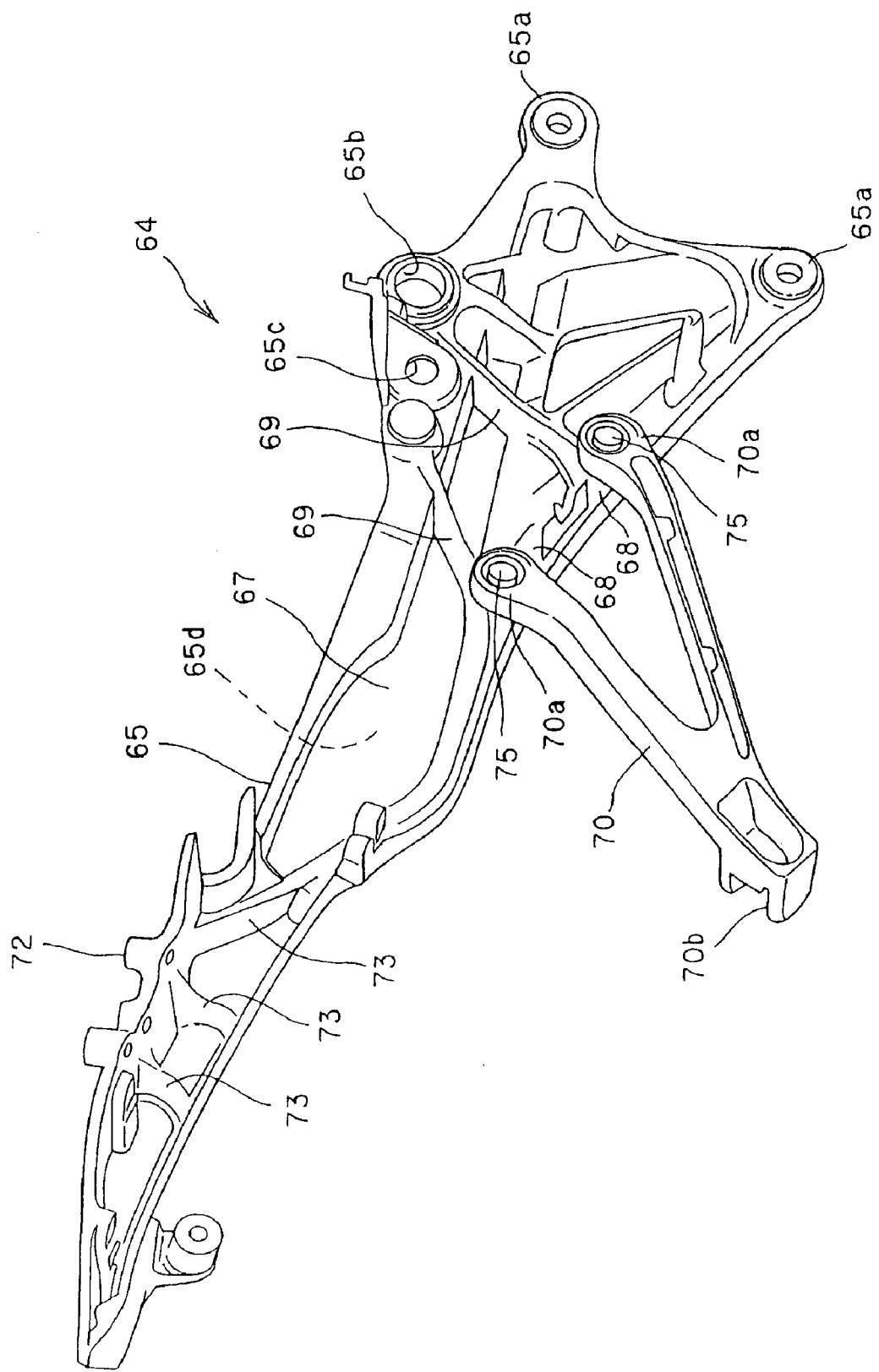
FIG. 3 is an inner side view of the side wall portion shown in FIG. 2 as viewed from the inside.

FIG. 2 is a left side view showing a state that the step holder 70 is mounted on a side wall portion 65 of the seat rail 64. Further, FIG. 3 is a view showing the side wall portion 65 shown in FIG. 2 as observed from the inside. In FIG. 2, a left side of the drawing indicates the front side of the vehicle, and in FIG. 3, a right side of the drawing indicates a front side of the vehicle.

The seat rail 64 is constituted of side wall portions 65, 65 constituting left and right side portions and a joint portion (not shown in the drawing) joining the respective side wall portions 65, 65 in the lateral widthwise direction.

A front end portion of the side wall portion 65 is vertically bifurcated and two mounting portions 65a, 65a to be mounted on the main frame 62 are arranged on distal end portions of the bifurcated portions in a vertically spaced-apart manner. Further, on a front upper portion of the side wall portion 65, a mounting portion 65b on which a rear portion of the fuel tank 21 is rotatably mounted and a mounting portion 65c on which the fuel tank cover 24 is mounted are mounted. In these mounting portions 65a, 65b and 65c, a through hole which penetrates the mounting portion in the vehicle widthwise direction is formed.

Further, the side wall portion 65 has a thickness thereof in the vertical direction which gradually decreases rearwardly from a front end portion thereof, and has an outer surface 65d of the side wall portion 65 which is gently curved. Hence, the side wall portion 65 is formed with good appearance. Due to such a constitution, even when the outer surface 65d of the side wall portion 65 is observed from the outside of the motorcycle 1 in a state that the seat rail 64 is assembled in the vehicle body, there is no possibility that the appearance of the motorcycle 1 is damaged. The good appearance of the motorcycle 1 can be suitably designed corresponding to various types of vehicles.

On a front-side portion of the side wall portion 65 slightly close to the center of the side wall portion 65, a step holder 70 projecting downwardly from the side wall portion 65 is mounted. As shown in FIG. 3, the step holder 70 is formed into a V-shape as viewed in a side view, and upper distal end portions 70a, 70a of the step holder 70 are fastened to an inner surface of the side wall portion 65 using two mounting bolts 75, 75 (see FIG. 3) which are inserted from a vehicle inner side of the side wall portion 65 of a vehicle (side facing the center of the vehicle body). Head portions of the mounting bolts 75, 75 are, in a state that the step holder 70 is fastened to the side wall portion 65, fitted in recessed portions formed in the distal end portions 70a, 70a (see, FIG. 3 and FIG. 8) such that the head portions of the mounting bolts 75, 75 are arranged coplanar with surfaces of the distal end portion 70a, 70a or not to project from the surfaces of the distal end portions 70a, 70a.

On a lower end portion of the step holder 70, that is, on a proximal portion of the step holder 70 where the step holder 70 is bifurcated into a V-shape, a step mounting portion 70b which projects toward the outside of the vehicle body is mounted. A step 71 (see FIG. 1 and FIG. 5 to FIG. 7) is mounted on the step mounting portion 70b. Further, the step holder 70 extends outwardly in an inclined manner so as to allow the step mounting portion 70b to be positioned more in the vehicle outward direction than the distal end portion 70a, whereby the step 71 is arranged at a position close to a foot of a rider who sits on a rear seat.

As shown in FIG. 3, on the inner surface of the side wall portion 65, a groove 67 for reducing a wall thickness is formed in the whole side wall portion 65 thus making the side wall portion 65 light-weight. Further, on a lower side of the inner surface of the side wall portion 65, mounting portions 68, 68 are formed into a boss shape with respect to the groove, and two distal end portions 70a, 70a of the step holder 70 are mounted on the mounting portions 68, 68.

In the inside of the groove 67, two ribs 69, 69 for reinforcing the mounting portions 68, 68 are arranged in a substantially vertically extending manner in a state that the ribs 69, 69 connect the mounting portions 68, 68 and an upper portion of the groove 67. Here, the number of ribs 69, 69 may be two or more depending on a shape of the side wall portion 65 or a shape of the groove 67. The extending directions of the ribs may be also suitably determined depending on a shape of the side wall portion 65 or a shape of the groove 67. Further, in the inside of the grove 67, a reinforcing rib 73 is also arranged in the vicinity of or in front of the rear seat mounting portion 72 in the same manner.

Figure 4:
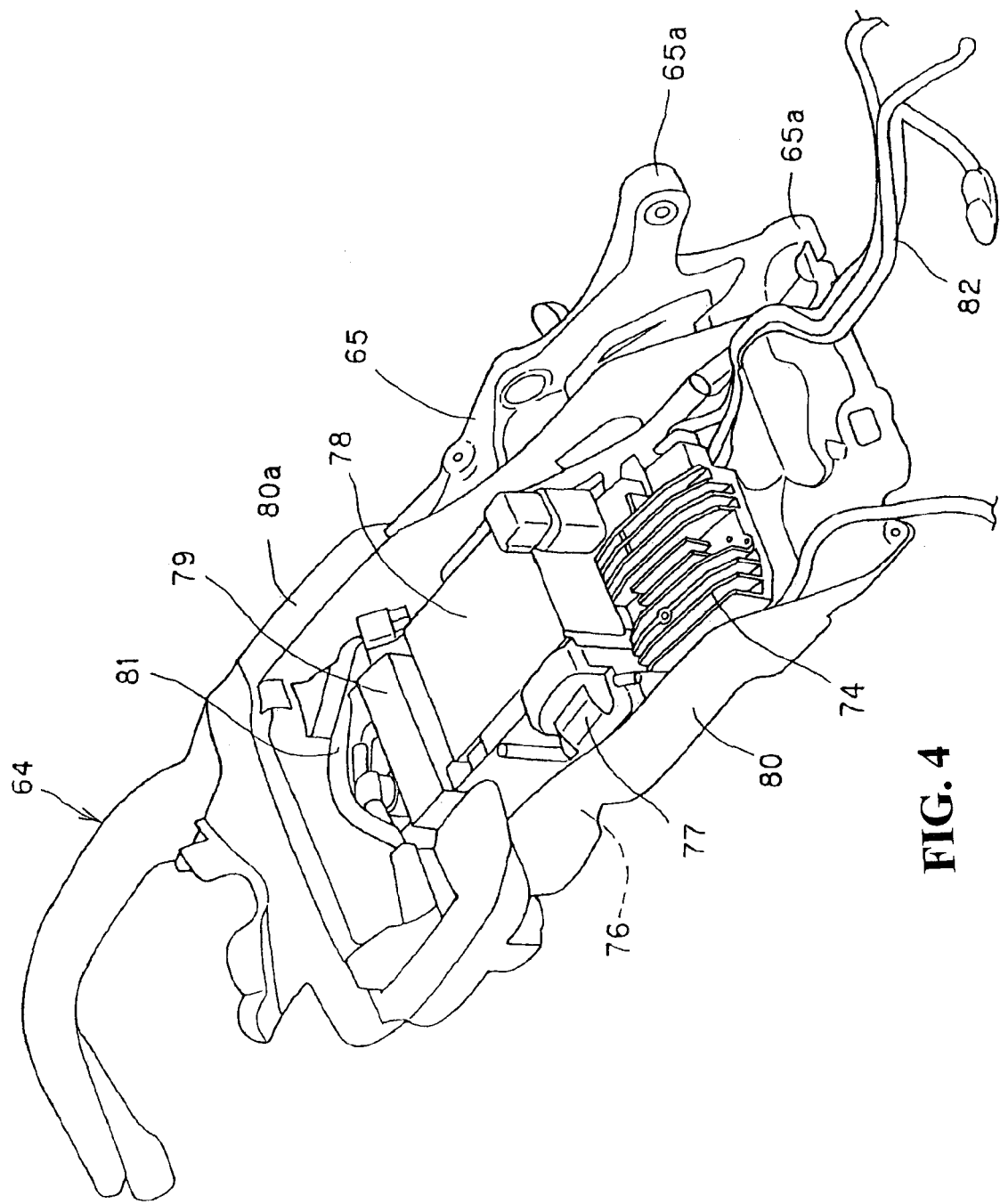
FIG. 4 is a perspective view showing a state that a cover is mounted on an inner side of the seat rail as viewed from an upper oblique anterior angle.
Figure 5:
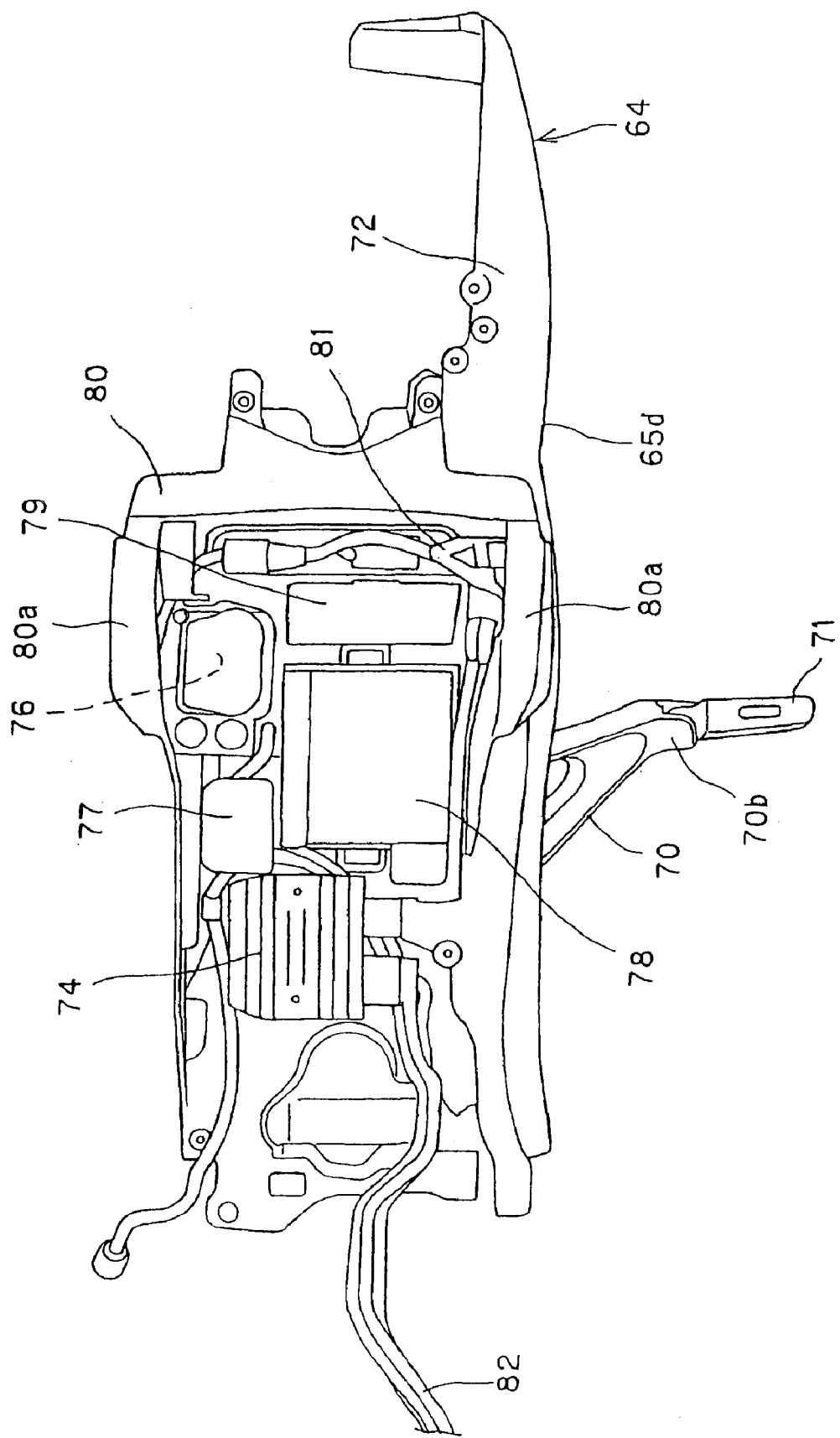
FIG. 5 is a plan view of the state shown in FIG. 3 as viewed from above.
Figure 6:
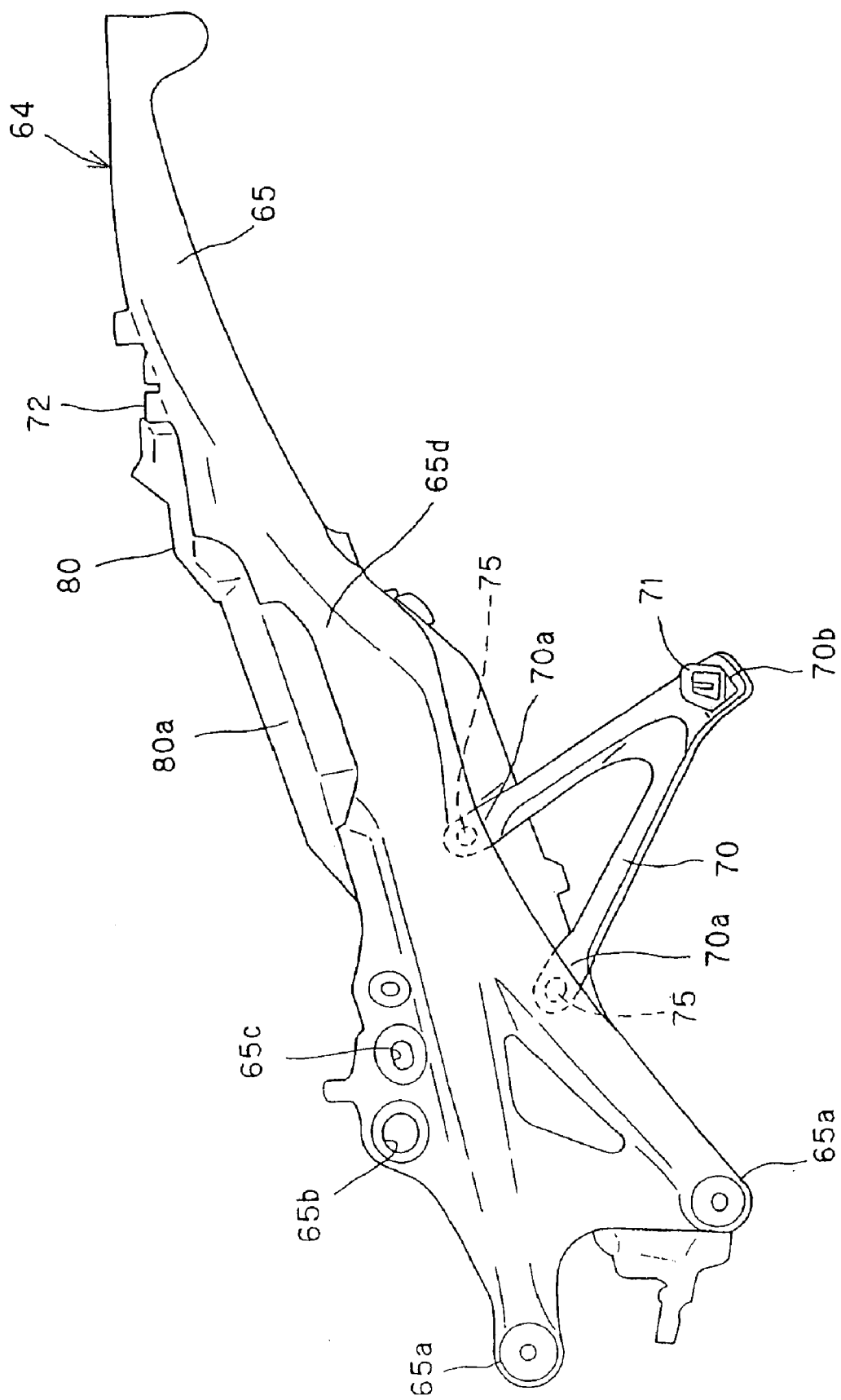
FIG. 6 is a side view of the state shown in FIG. 3 as viewed from a left side.

FIG. 4 is a perspective view showing a state that a cover is mounted on an inner side of the seat rail 64. Further, FIG. 5 is a plan view of the state shown in FIG. 4 as viewed from above. Further, FIG. 6 is a side view showing the state shown in FIG. 4 as observed from the outside. Here, in FIG. 4 to FIG. 6, the right side wall portion which makes a pair with the side wall portion 65 and is positioned at a right side portion and a joint portion which connects the pair of side wall portions in the widthwise direction are omitted. Further, in FIG. 4, a front side of the vehicle body extends in the right oblique downward direction of the drawing, and in FIG. 5 and FIG. 6, the front side of the vehicle body extends in the leftward direction of the drawing.

As shown in FIG. 4 and FIG. 5, a cover 80 has a box shape with an open-ended upper surface and an open-ended front surface. When the front seat 22 is removed, these openings of the cover 80 face the outside. In the inside of the cover 80, a fuse box 79, a regulator 74, an exhaust-valve-use servomotor 76, a starter-use magnet 77, a battery 78 and the like are housed. Electric-system lines such as lines 81 for the stop lamp 43 and the license plate light 11 and lines 82 for the servomotor 76 can be relayed in the inside of the cover 80.

A size of the cover 80 in the widthwise direction is set substantially equal to a width size (a distance between the inner surfaces of the side wall portions which face each other in an opposed manner) of a portion surrounded by the pair of left and right side wall portions 65, thus ensuring a housing space as large as possible in the inside of the cover 80. Further, on both left and right sides of an upper rear portion of the cover 80, mounting portions 80a, 80a extending outwardly in the vehicle-width direction in a flange shape are respectively mounted. When the cover 80 is mounted on the seat rail 64 from above, the mounting portions 80a are placed on upper surfaces of the left and right side wall portions 65, thus ensuring the positioning of the cover 80 in the vertical direction. Further, the cover 80 is mounted on a joint member not shown in the drawing, which connects the left and right side wall portions 65 in the widthwise direction using mounting bolts or the like.

Figure 7:
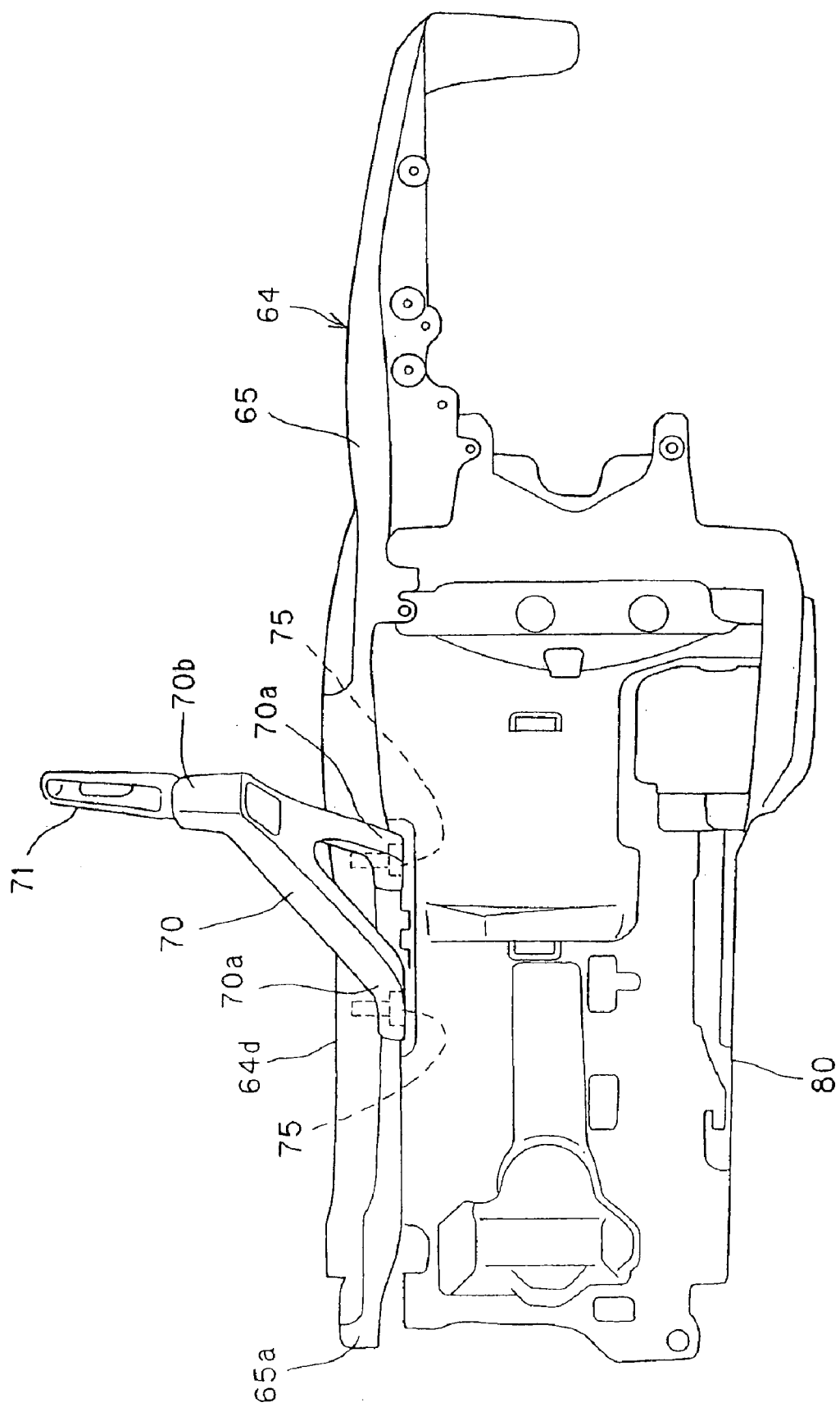
FIG. 7 is a bottom view of the state shown in FIG. 3 as viewed from below.
Figure 8:
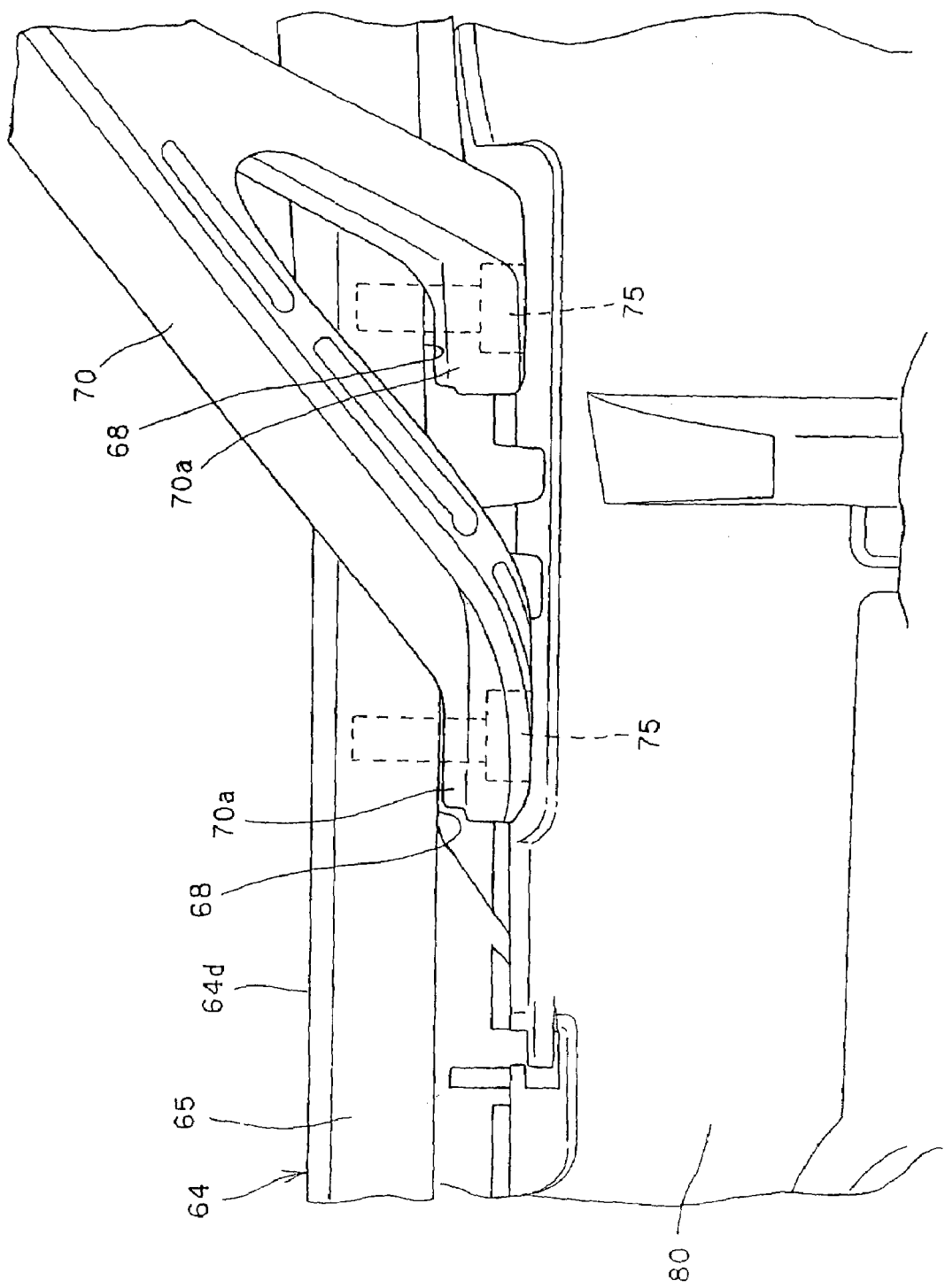
FIG. 8 is a bottom view showing a mounting portion of a step holder shown in FIG. 7 in an enlarged manner.

FIG. 7 is a bottom view of the state shown in FIG. 4 as viewed from below. Further, FIG. 8 is an enlarged view of a portion where the step holder 70 is mounted.

In a state that the cover 80 is mounted, two distal end portions 70a, 70a of the step holder 70 and the head portions of the mounting bolts 75, 75 are covered with a side surface portion of the cover 80 from the inside. To explain in more detail, the side surface portion of the cover 80 is arranged in the axial direction of the mounting bolt 75 (axial direction extending in the removing and mounting direction of the mounting bolt 75) and more inside than the mounting bolts 75. In such a state, the mounting bolts 75, 75 are configured such that the mounting bolts 75, 75 cannot be removed unless the cover 80 is removed from the seat rail 64 so that the side surface portion of the cover 80 performs a function of preventing the removal of the mounting bolts 75, 75. To be more specific, to acquire this removal preventing function, a size of a gap between the side surface portion of the cover 80 and the head portion of the mounting bolt 75 (or a front surface of the distal end portion 70a of the step holder) is set to be smaller than a total length of the mounting bolt 75.

Further, by assembling the cover 80 and the head portion of the mounting bolt 75 in a close contact state by eliminating a gap between these parts, the side surface portion of the cover 80 can also perform a loosening preventing function which prevents the rotation of the mounting bolt 75, in addition to the removal preventing function, which prevents the removal of the mounting bolt 75.

Due to the step holder mounting structure of the motorcycle according to the embodiment of the present invention, by fastening the step holder 70 to the seat rail 64 from the inside of the vehicle, it is possible to prevent the mounting portions 68 of the step holder and the mounting bolts 75 for mounting the step holder 70 on the seat rail 64 from being observed from the outer surface 65*d* of the seat rail 64 (side wall portion 65). Accordingly, different from the conventional technique, it is unnecessary to conceal the head portions of the mounting bolts 75 by covering the seat rail 64 with the rear cowl 41 or the side cover and hence, it is possible to enhance the degree of freedom in design of the portion of the seat rail 64. Further, by enhancing the design of the outer surface 65*d* of the seat rail 64, it is possible to decrease an area of the seat rail 64 covered with the rear cowl 41 and the like or it is possible to make the rear cowl 41 and the like unnecessary and hence, the reduction of cost of parts such as the rear cowl 41 and the like can be realized.

Further, by arranging the cover 80 more inside than the mounting bolts 75 for mounting the step holder 70, it is possible to prevent the mounting bolts 75 from being removed from the seat rail 64 and hence, the step holder 70 can be further surely mounted on the seat rail 64.

Further, by housing electric parts such as the fuse box 79, the battery 78 and the like in the inside of the cover 80, it is possible to relay the lines 81, 82 for the stop lamp 43 and the license plate light 11 in the inside of the cover 80. Due to such constitution, it is possible to facilitate a wiring operation in assembling these parts or in performing the maintenance.

Still further, the groove 67 for reducing the wall thickness is formed over the whole side surface of the seat rail 64, and the ribs 69 for reinforcing the mounting potions 68 of the step holder 70 are arranged in the inside of the groove 67 and hence, it is possible to make the seat rail 64 light-weight. Accordingly, it is possible to make the whole vehicle body light-weight and, at the same time, a material cost of the seat rail 64 can be reduced. Further, the strength of the mounting portions 68 of the step holder 70 can be ensured and hence, it is possible to surely mount the step holder 70 on the seat rail 64.

Although the explanation has been made with respect to the embodiment of the present invention heretofore, various modifications and variations are conceivable based on the technical concept of the present invention.

For example, in the embodiment of the present invention, although the box-shaped cover 80 which can house the fuse box 79 and the like is arranged more inside than the mounting bolts 75 for fastening the step holder 70 to the seat rail 64, provided that the cover can cover the head portions of the fastened mounting bolts 75, can perform the function of preventing the removal of the mounting bolt 75, and can perform the function of preventing loosening of the mounting bolts 75, the cover may not be formed in a box shape which allows the cover to house the fuse box 79 and the like. Due to such construction, it is possible to further surely mount the step holder 70 on the seat rail 64.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

The invention claimed is:

1. A step holder mounting structure of a motorcycle, comprising:
   a seat rail extending rearwardly from a main frame of said motorcycle,
   a step holder for supporting stepping of a rider of said motorcycle, said step holder being fastened to a surface of said seat rail substantially facing a center line of said motorcycle,
   a groove formed on substantially all of an inner surface of said seat rail, and
   at least one rib for reinforcing a mounting portion of said seat rail where said seat rail is fastened to said step holder, said at least one rib being disposed inside of said groove formed in said seat rail.

2. The step holder mounting structure of a motorcycle according to claim 1, further comprising:
   a cover disposed in the axial direction of a fastening member fastening said step holder to said seat rail, said cover being disposed closer to the center line of said motorcycle than said fastening member.

3. The step holder mounting structure of a motorcycle according to claim 2, wherein said step holder is fastened to said seat rail by the fastening member having a head portion substantially facing the center line of said motorcycle.

4. The step holder mounting structure of a motorcycle according to claim 1, wherein said step holder is fastened to said seat rail by a fastening member having a head portion substantially facing the line of said motorcycle.

* * * * *